Feb. 3, 1948. T. L. DIMOND 2,435,207
PHASE SYNCHRONIZED PULSED TRIGGER CIRCUIT
Filed Sept. 28, 1945 2 Sheets-Sheet 1
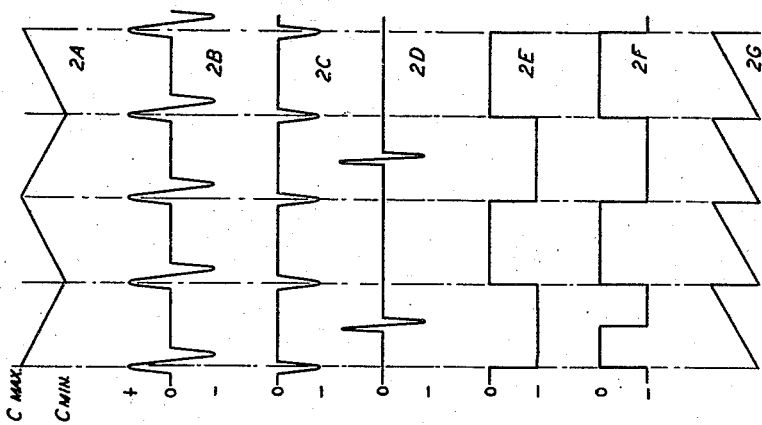
FIG. 2
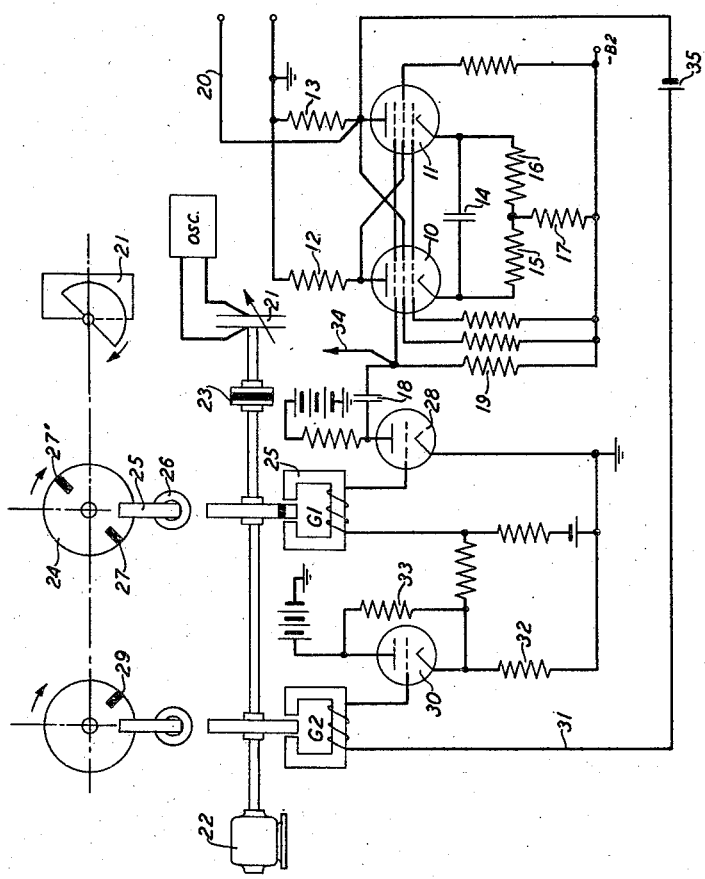
FIG. 1A
FIG. 1
INVENTOR
T. L. DIMOND
BY
*G. H. Stevenson*
ATTORNEY

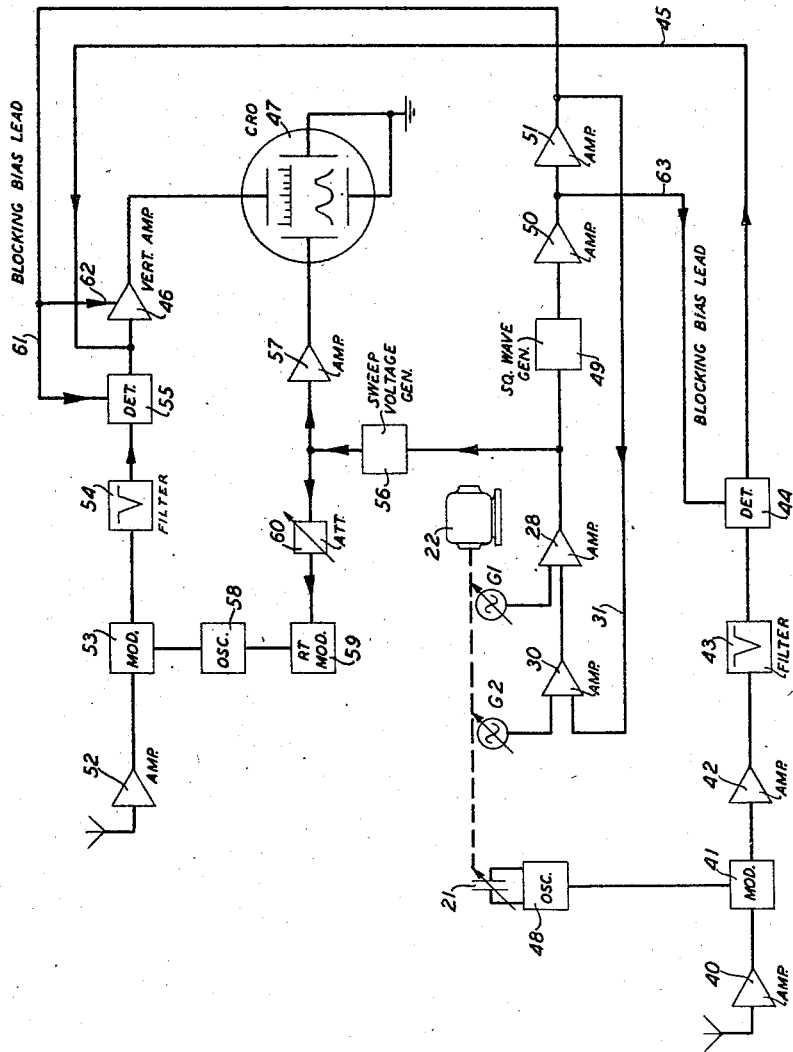

Patented Feb. 3, 1948

2,435,207

UNITED STATES PATENT OFFICE 2,435,207

PHASE SYNCHRONIZED PULSED TRIGGER CIRCUIT

Thomas L. Dimond, Rutherford, N. J., assignor to Bell Telephone Laboratories, Incorporated, New York, N. Y., a corporation of New York Application September 28, 1945, Serial No. 619,175

6 Claims. (Cl. 250—27)

This invention relates to the phasing of synchronous systems and more particularly to the phase control of an electronic wave generator of the trigger circuit type which is operated in synchronism with a source of recurrent pulses.

Electronic trigger circuits of the type having two conditions of stable equilibrium have been extensively used as generators of rectangular voltage waves, the waves being generated by switching from one condition of stable equilibrium to the other under the influence of recurrent voltage pulses. Such circuits have the advantageous property of very quick response which makes it possible to produce rectangular waves of very high frequency without impairment of the wave shape and also to produce waves of as low frequency as may be desired. They also have the advantage that voltages of substantial magnitude are easily obtained. One problem arises, however, in the use of such circuits, namely, that of ensuring starting in the correct phase. Since the circuits are responsive to pulses of one sign only and switch from one stable condition to the other with each successive pulse, the condition established at the time a circuit is first energized may be either one of the two stable conditions, depending upon quite fortuitous circumstances. Because of this, the rectangular wave, although synchronized with the pulse source, is subject to a phase uncertainty of a half period. When the driving pulses are derived from a sinusoidal wave or from a rotating mechanical element, the phase uncertainty would result in a possible phase displacement of a fixed amount between the rectangular wave and the driving source.

The principal object of the invention is to eliminate the phase uncertainty of trigger circuits used as rectangular wave generators.

Another object is to control the phase of such a generator with respect to a rotating mechanical device.

These objects are accomplished by the use of auxiliary phase controlling pulses which recur at half the rate of the synchronizing pulses in the alternate intervals between the latter and which are applied to the trigger circuit wave generator through a path which is automatically blocked when the phase condition is correct. In the event that the phase of the rectangular wave becomes reversed, the path over which the phase controlling pulses are supplied is automatically unblocked and an auxiliary pulse passes to the trigger circuit causing it to switch and so reestablish the correct phase condition.

The invention will be more fully understood from the following detailed description and from the appended drawings of which:

Figs. 1 and 1A show one form of the invention;

Fig. 2 is explanatory of the operation of the invention; and

Fig. 3 illustrates the application of the invention in a panoramic scanning radio receiver.

In the embodiment of the invention shown in Figs. 1 and 1A, a square wave generator or trigger circuit of the Eccles-Jordan type is operated in synchronism with and in fixed phase relation to a rotating mechanical element which, for example, is a motor-driven air condenser included in the frequency-determining circuit of an oscillation generator. The arrangement is such that the square wave has a period equal to the time of one complete revolution of the condenser and is controlled to maintain a fixed phase relation with respect to the variation of the condenser capacity; that is, the wave is controlled to have an assigned polarity or value during the time when the condenser capacity is increasing and a different polarity or value when the capacity is decreasing.

The square wave generator comprises pentode tubes 10 and 11 which are interconnected regeneratively by cross-connecting the central or screen grid of each tube to the plate of the other. Space current is supplied through resistors 12 and 13 connecting the plates of the respective tubes to the positive side of a direct current source, not shown. The cathodes are coupled to each other and to the negative terminal, $-B_2$, of the supply source through a bridged-T network comprising condenser 14 and resistors 15, 16 and 17. The screen grids, in addition to being cross-connected to the plates of the other tubes, are returned to the negative side of the supply source through high resistances. The inner grids, adjacent to the cathodes are connected together and are likewise returned to the negative supply terminal through a high resistance as shown. The outer grids which form the input terminal upon which the driving pulses are impressed are connected together and to an input circuit comprising coupling condenser 18 and resistor 19.

Circuits of this type are characterized by having two conditions of stable equilibrium in which the space current flow is confined to one of the tubes, the other being blocked. The switching from one stable condition to the other, that is, the transfer of space current from one tube to the other, is effected by applying a negative pulse to the outer grids. The pulse interrupts the space current of the conducting tube, whichever it may be, so that momentarily both tubes are blocked. During this instant the charge previously accumulated in condenser 14 still remains and acts to maintain a potential difference between the two cathodes such that, as the pulse disappears, current will start to flow first in the tube that had previously been blocked. The regenerative interconnection then builds up the current in that tube so that the transfer is very rapidly completed. Each successive negative pulse switches the plate current from one tube to the other with accompanying variations of the plate potentials which follow sharply rectangular wave forms. In the circuit shown the positive side of the space current supply is grounded and the output of the generator is obtained between the plate of tube 11 and ground by means of lead 20. This provides a voltage which varies between two negative values, the smaller value being determined by the current flow in resistor 13 to the screen grid of tube 10 when tube 11 is blocked and the larger value by the flow of plate current when tube 11 conducts.

The rotating condenser with which the square wave generator is synchronized is shown at 21 mounted on a shaft driven by motor 22, which may include gearing to reduce the shaft speed to a desired value. An insulating coupling 23 is interposed in the shaft to isolate the rotating plates of the condenser.

Driving pulses for the square wave generator are obtained from a generator $G_1$ coupled to the motor shaft. This generator is of the induction type, comprising a rotor 24 of non-magnetic material mounted on the shaft, a magnet 25 embracing the edge of rotor between its poles as shown, and an output winding 26. The rotor is disc-shaped and has inserted at diametrically opposite points in its periphery two iron slugs shown at 27 and 27' in Fig. 1A. As these pass between the poles of the magnet, the magnetic flux is suddenly increased and a voltage pulse is generated in winding 26. Magnet 25 may be a permanent magnet or if desired, a supplementary polarizing winding may be used.

The pulses generated in winding 26 consist of two short pulses of opposite signs corresponding respectively to the rise and the fall of the magnetic flux. Their form is illustrated in graph 2B of Fig. 2. They are applied to the grid of amplifying tube 28 which is biased substantially to its plate current cut-off and the amplified pulses are passed to the driving grids of tubes 10 and 11 through condenser 18. Only the positive portions of the generator pulses are effective in amplifier 28, the negative portions merely serving to increase the cut-off bias. The positive portions cause spurts of space current in the tube, lowering the plate potential and resulting in a series of negative pulses on the trigger circuit grids of the character shown in graph 2C.

As will be seen in Fig. 1A, wherein the generators and the air condenser are shown in side elevation, the rotor is mounted on the driving shaft in such relation to the air condenser that a pulse is produced at the instant the condenser blades are fully engaged and another pulse is produced when they are disengaged and the capacity is a minimum. The time variation of the capacity is illustrated by graph 2A of Fig. 2. The square wave thus has one phase while the capacity is increasing and the opposite phase while the capacity is decreasing. It will be evident, however, that in the absence of any further control, the phase of the wave might be the reverse of that desired, since the driving pulses control only the transfer of the plate current and do not determine which of the two tubes will be energized.

Phase control is obtained by means of pulses from a second generator $G_2$ which is similar to $G_1$ except that its rotor has only one magnetic slug, shown at 29 in Fig. 1A. This slug is so located as to generate a pulse at about the middle of the alternate intervals between the pulses of the driving generator as illustrated by graph 2D. These pulses together with the output voltage of the square wave generator are impressed on the grid of amplifier 30 through a circuit including the generator winding and connection 31 to the plate of tube 11 in which is included a potential source 35, for example, a battery or other direct current source. The purpose of source 35 is to provide a bias for the rectangular wave impressed on tube 30. As was pointed out earlier, the anode potential of tube 11 varies between two negative values, the smaller of which is determined by the current flow in the return resistor connected to the screen grid of tube 10. Source 35 may therefore be used to compensate all or part of this minimum potential so that the resultant voltage supplied over lead 31 varies between about zero and a definite negative value. Amplifier 30 is of the cathode follower type, the amplified pulses appearing in cathode lead resistor 32 without phase reversal and being passed on to the input of tube 28.

The operation of the phase controlling circuit is such as to maintain the plate of tube 11 in its more negative phase during that half of the condenser revolution in which generator $G_2$ produces a pulse. In the case illustrated this corresponds to the time when the condenser capacity is decreasing. The output voltage of tube 11 during its more negative phase provides a control bias on the grid of tube 30 which is sufficient to block the space current flow and to prevent the transmission of the pulse from generator $G_2$. So long, therefore, as the output of the square wave generator is in this phase relationship to the condenser, as shown in graph 2E, the pulses from generator $G_2$ will be ineffective and the phase will be maintained. If, however, the square wave generator should start in the wrong phase or should be accidentally reversed by some extraneous pulse, tube 30 would no longer be blocked at the instant a pulse is generated by $G_2$ and such a pulse would be transmitted to the driving grids of tubes 10 and 11. Switching of the circuit follows and the phase of the output is restored to its correct condition. Graph 2F illustrates the restoration of the correct phase by a pulse from $G_2$ after it has been reversed for some reason.

It will be evident that the driving and phase controlling pulses might be produced by other means than the electromagnetic generators illustrated, but the latter have the advantage that no mechanically operated contacts or brushes are employed which would be likely to give rise to trouble in continuous use. The generator pulses may if desired be used to drive other synchronized devices and for this purpose a lead 34 connected to the input of the square wave generator may be employed.

The application of the invention in a multiple band scanning radio system is illustrated schematically in Fig. 3. The system is arranged to scan in rapid alternation a broad-band of frequencies and a narrow band, which may be a portion of the broad-band, and to exhibit the spectra of the two bands simultaneously on a single cathode-ray oscilloscope. The scanning of a very wide frequency band requires the variation of the tuning elements of a radio receiver through a correspondingly wide range of values and this is most readily accomplished by mechanical means. For example, by rotating an air condenser which constitutes the tuning capacity of the beating oscillator in a superheterodyne receiver, the receiver may be tuned through a three to one range of frequencies. On the other hand, the tuning variation needed for narrow band scanning may be accomplished by wholly electrical means, but none of these means is able to produce the wide range of tuning possible with mechanical tuning.

In the system shown in Fig. 3 two radio receivers are employed, one for wide band scanning and the other for narrow band scanning. The wide band scanner is mechanically tuned by rotating the beating oscillator condenser, while the narrow band scanner employs a reactance tube frequency modulator energized by a saw-tooth sweep voltage wave.

The square wave generator is used to switch the cathode-ray oscilloscope tube between the outputs of the two receivers in synchronism with the scanning periods and to block the output of each receiver while the other is in operation. It is also used to provide suitable bias voltage for the vertical plates of the oscilloscope for the purpose of separating the traces for the two receiver outputs. By means of the controls operated by the square wave, the wide band is scanned during one-half revolution of the rotating condenser and the narrow band is scanned during the other half revolution.

In such a system it is necessary that the oscilloscope traces should always show the results of scanning in one direction only, otherwise the information gained as to the waves present in the scanned range may be useless. This is accomplished by the use of the invention, which maintains the phase of the square wave generator in correct phase with respect to the tuning variation of the receiver and ensures that the switching of the circuits takes place in the proper order.

Referring to Fig. 3, the broad-band scanning receiver comprises non-selective radio frequency amplifier 40, heterodyne modulator 41, intermediate frequency amplifier 42, a narrow band intermediate frequency scanning filter 43, and signal detector 44. The detected output goes by line 45 to amplifier 46 and from thence to the vertical deflecting plates of cathode-ray oscilloscope 47. Beating oscillator 48 includes a variable air condenser 21, which with driving motor 22, pulse generators G₁ and G₂ and control amplifiers 28 and 30 correspond to the like numbered elements of Fig. 1. The square wave generator indicated at 49 has its output connected to two phase reversing amplifier stages 50 and 51 and the biasing feedback for amplifier 30 is derived from the output of the second stage and returned by line 31. The narrow band receiver comprises a radio frequency amplifier 52, heterodyne modulator 53, beating oscillator 58, sharply selective scanning filter 54, and signal detector 55, the output of which is connected to vertical amplifier 46 in parallel with the output from the broad-band receiver.

The sweep voltage for the hrizontal deflection of the oscilloscope beam is obtained from a generator 56 which is synchronized by the pulses from G₂. This generator may be a relaxation circuit of the multivibrator type in accordance with common practice. It generates a saw-tooth wave of the form illustrated by graph 2G and of a period equal to the time between the pulses from G₂. The saw-tooth voltage is applied to the oscilloscope horizontal plates through amplifier 57, the sweep of the beam being thereby synchronized with each scanning period. It is applied also to vary the frequency of beating oscillator 58 by means of reactance tube modulator 59. Attenuator 60 may be adjusted to vary the strength of the saw-tooth voltage applied to the modulator and so to control the extent of the range scanned by the receiver.

The square wave output of amplifier 51 is applied to detector 55 of the narrow band receiver in such a way as to effectively block transmission therethrough during the broad-band scanning period. The same voltage is applied to vertical amplifier 62 and is utilized therein to produce an upward shift of the oscilloscope trace during this period. A blocking bias for the broad-band detector is supplied through line 63 from the output of amplifier 50. The square wave at this point has a reverse phase and blocks the broad-band circuit during the narrow band scanning interval.

What is claimed is:

1. In combination, a rectangular wave generator comprising a vacuum tube trigger circuit having two conditions of stable equilibrium and arranged to switch from one stable condition to the other in response to the application of a voltage pulse, a source of pulses recurrent at intervals corresponding to the polarity changes of the rectangular wave, circuit means for applying the pulses from said source to the trigger circuit, and phase synchronizing means comprising a second source of pulses timed to recur in alternate intervals between the pulses from said first source, a circuit for applying pulses from said second source to operate the trigger circuit, and means controlled by the rectangular wave output of the trigger circuit for blocking the transmission of pulses from said second source during alternate half periods of the rectangular wave.

2. The combination set forth in claim 1 in which the circuit coupling the second mentioned pulse source and the trigger circuit includes a vacuum tube amplifier having a control grid and a circuit coupling said control grid with the output of the trigger circuit to produce a blocking bias during alternate half periods of the rectangular wave.

3. In combination, a rectangular wave generator comprising a vacuum tube trigger circuit having two conditions of stable equilibrium and arranged to switch from one stable condition to the other in response to the application of a voltage pulse, an output circuit, a rotating element with which the rectangular wave generator is to be maintained in synchronism, a source of voltage pulses driven by said rotating element supplying pulses recurrent at intervals corresponding to polarity changes of the rectangular wave, circuit means for applying the pulses from said source to the trigger circuit to effect switching thereof, a second pulse source driven by said rotating element and supplying pulses recurrent in alternate intervals between the pulses from said first source, circuit means for applying pulses from said second source to effect switching of the trigger circuit, and means controlled by the rectangular wave output of the trigger circuit for interrupting the circuit from said second generator during alternate half cycles of the rectangular wave.

4. In combination, a trigger circuit comprising a pair of grid-controlled vacuum tubes coupled to each other regeneratively to provide two conditions of stable equilibrium with plate current confined to one tube or the other, means for effecting the switching of said trigger circuit from one stable condition to the other, said means comprising a circuit for impressing voltage pulses on the tubes simultaneously, a source of recurrent pulses included in said switching circuit, an output circuit connected to one of said tubes for supplying waves of rectangular wave form synchronized with the pulses from said source, a second source supplying pulses timed to recur in alternate intervals between the pulses from said first source, and a control circuit including a grid-controlled vacuum tube amplifier and said output circuit coupling said second source and the input of said trigger circuit, said output circuit being connected in series with the control grid of said amplifier whereby the output voltage of the trigger circuit is effective to disable said amplifier during alternate half cycles of the rectangular wave.

5. A system in accordance with claim 4 including a rotating mechanical element with which the switching of the trigger circuit is synchronized and in which the timing of the pulses from the said sources is controlled mechanically by said rotating element.

6. In combination, a rectangular wave generator comprising a vacuum tube trigger circuit having two conditions of stable equilibrium and arranged to be switched from one stable condition to the other in response to the application of a voltage pulse, an output circuit therefor, a source of voltage pulses recurrent at intervals corresponding to the polarity changes of the rectangular wave, a circuit including a grid-controlled vacuum tube coupling said source to the input of said trigger circuit, a second source of pulses operating in timed relation to said first source and supplying pulses recurrent in alternate intervals between the pulses from said first source, a second grid-controlled vacuum tube having its output circuit coupled to the control grid of said first tube, and a phase control circuit including the second pulse generator, said first-mentioned output circuit and the control grid of said second tube, said control circuit supplying a biasing voltage from the output of the trigger circuit sufficient to prevent the transmission of pulses from said second source through said second tube during alternate half cycles of the rectangular wave.

THOMAS L. DIMOND.